United States Patent
Walia et al.

(10) Patent No.: US 10,875,050 B2
(45) Date of Patent: Dec. 29, 2020

(54) METHOD TO MAKE AN ELASTOMERIC POLYOLEFIN SKIN

(71) Applicant: Dow Global Technologies LLC, Midland, MI (US)

(72) Inventors: Parvinder S. Walia, Midland, MI (US); Amit K. Chaudhary, Midland, MI (US); George A. Klumb, Midland, MI (US)

(73) Assignee: DOW GLOBAL TECHNLOGIES LLC, Midland, MI (US)

( * ) Notice: Subject to any disclaimer, the term of this patent is extended or adjusted under 35 U.S.C. 154(b) by 383 days.

(21) Appl. No.: 15/554,910

(22) PCT Filed: Mar. 1, 2016

(86) PCT No.: PCT/US2016/020184
§ 371 (c)(1),
(2) Date: Aug. 31, 2017

(87) PCT Pub. No.: WO2016/148897
PCT Pub. Date: Sep. 22, 2016

(65) Prior Publication Data
US 2018/0043392 A1 Feb. 15, 2018

Related U.S. Application Data

(60) Provisional application No. 62/134,872, filed on Mar. 18, 2015.

(51) Int. Cl.
*B05D 1/02* (2006.01)
*C09D 153/00* (2006.01)
*C09D 123/08* (2006.01)

(52) U.S. Cl.
CPC ......... *B05D 1/02* (2013.01); *C09D 123/0815* (2013.01); *C09D 153/00* (2013.01)

(58) Field of Classification Search
CPC ....... B29C 41/00; B29C 41/003; B29C 41/08; B29C 41/22; B29C 41/34; B29C 41/365; B05D 1/02; C09D 123/0815
See application file for complete search history.

(56) References Cited

U.S. PATENT DOCUMENTS

| | | | | |
|---|---|---|---|---|
| 4,356,230 A | * | 10/1982 | Emanuel | B29C 37/0032 442/180 |
| 5,538,576 A | * | 7/1996 | Knop | B05D 5/06 156/229 |
| 5,656,677 A | * | 8/1997 | Jourquin | C08G 18/161 204/422 |

(Continued)

FOREIGN PATENT DOCUMENTS

WO 2014105464 7/2014

*Primary Examiner* — Jacob T Minskey
*Assistant Examiner* — Jennifer A Kessie
(74) *Attorney, Agent, or Firm* — Cantor Colburn LLP

(57) ABSTRACT

The present invention relates to method to make a spray skin from an aqueous polyolefin dispersion composition comprising a an olefin block copolymer, a dispersing agent, preferably an ethylene acrylic acid, and water, wherein said aqueous dispersion preferably has a pH less than 12 and is derived from the melt blending. The method comprises the steps of spraying the aqueous polyolefin dispersion onto a heated mold forming the skin and then allowing it to dry.

16 Claims, 1 Drawing Sheet

(56) References Cited

U.S. PATENT DOCUMENTS

| | | | |
|---|---|---|---|
| 5,746,961 A * | 5/1998 | Stevenson | B05D 7/02 |
| | | | 106/218 |
| 6,544,449 B1 | 4/2003 | Gardner | |
| 8,674,027 B2 | 3/2014 | Krabbenborg | |
| 8,709,324 B2 | 4/2014 | Benoit et al. | |
| 2010/0227520 A1 * | 9/2010 | Claasen | D06N 3/045 |
| | | | 442/59 |

* cited by examiner

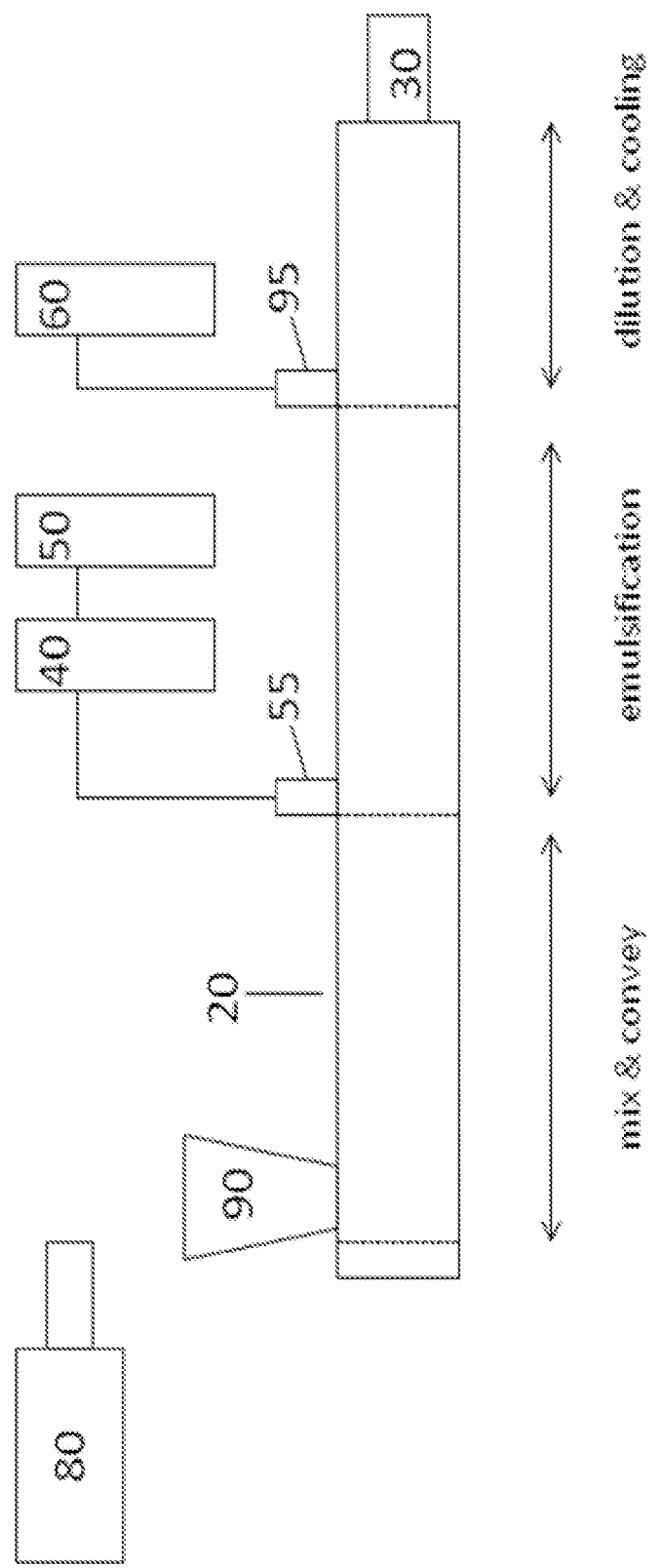

METHOD TO MAKE AN ELASTOMERIC POLYOLEFIN SKIN

FIELD OF THE INVENTION

The present invention relates to a method for producing a flexible elastomeric polyolefin skin wherein an aqueous polyolefin dispersion is sprayed onto a mold surface and the polyolefin dispersion is allowed to dry to produce the skin layer. The aqueous polyolefin dispersion is derived from the melt blending of thermoplastic polymer, a dispersing agent, and water, wherein said aqueous dispersion preferably has a pH less than 12.

BACKGROUND OF THE INVENTION

There are several methods to make skins for plastic articles, for example skins on an automotive interior article, such as an instrument panel, door panel, console, glove compartment cover, etc. Positive thermoforming, negative thermoforming, shush molding, and sprayed are four major processes used to make skins for such interior articles.

Textured skin sheets for internal automotive furnishings, such as instrument panels, door trim and so on, were made principally of soft polyvinyl chloride resin (PVC). In recent years, however, olefinic thermoplastic elastomers have been used. Textured skins of olefinic thermoplastic elastomers may be produced by a number of techniques including positive and negative vacuum forming. Positive vacuum forming is carried out using a non-grained forming mold having perforations for evacuating the interface between the mold surface and the textured skin sheet (texture is formed on the outer face of an extruded sheet by embossing prior to vacuum forming) inside face by placing the texture or grain sheet on the mold with its textured outer face being exposed to the exterior and pressing the sheet onto the mold face by evacuating the space beneath the sheet. Therefore, the patterns of the textured outer face of the textured sheet may be apt to undergo deformation during the process of forming. In particular, a textured skin made of an olefinic thermoplastic elastomer may suffer from such deformation of the pattern upon a vacuum forming, especially upon positive vacuum forming, more easily as compared with that made of soft PVC, resulting in an inferior ability for retaining the texture.

Slush molding and spray processes offer the most design freedom with some process advantages. In the slush molding technique, a free-flowing, powdered polymer is charged to an open top container or box, i.e., a slush box. A heated mold in the form of the article or object to be molded is clamped on top of the slush box, and the container rotated in a manner such that the free-flowing polymer powder contacts the hot mold where the powder melts and flows over the mold. The container is then returned to its original position, the mold removed from the container, and the article removed from the mold. This technique can realize complex shapes with sharp edges and excellent grain retention.

Until recently, polyvinyl chloride (PVC) resins were the material of choice for interior skins, and they are ideally suited for slush molding. However, PVC formulations suffer from migration and volatilization of the plasticizers over time, and this leads both to physical property changes in the PVC as it ages and to fogging of the car window glass. PVC also suffers from being heavier than alternative materials (an important consideration in the current design of automobiles with the emphasis on lighter materials to reduce the overall weight of the vehicle and thus increase its gas efficiency). Additionally, the hardness, storage modulus, and brittleness of PVC increases as the ambient temperature decreases, and thus at low temperatures, e.g., about −40° C., the instrument panel skin upon airbag deployment could splinter.

Alternatives to PVC include thermoplastic polyurethanes (TPU), thermoplastic polyolefins (TPO), and polyolefin elastomers (POE) which can be engineered to have the necessary flow characteristics required for slush molding. TPU has good scratch and mar properties and better low temperature properties than PVC, but aromatic based TPU has poor ultraviolet (UV) light resistance. Aliphatic isocyanates can be used to prepare TPU having good UV light resistance but at a significant cost penalty.

Blends of polypropylene (PP) and a polyolefinic rubber, referred to as thermoplastic polyolefin (TPO), is yet another alternative. TPO posses better ductility than PVC. Moreover, it retains its ductility over time since it does not contain any low molecular weight plasticizers, as does PVC. TPO performs better in comparison to PVC in interior automotive applications. TPO is less expensive as compared to TPU.

Recently, new polyolefin elastomer (POE) resins have been shown to have good scratch and mar resistance, excellent low temperature properties, adequate hardness (e.g., Shore A hardness) while demonstrating good powder flow characteristics and the ability to be pulverized at ambient temperature, see US Publication No. 2012/0172534.

Polyurethanes have been the resins of choice for spray processes. Suitable polyurethane reaction mixtures for spraying flexible elastomeric polyurethane skins are disclosed in U.S. Pat. Nos. 5,656,677 and 8,709,324. A polyurethane reaction mixture is sprayed onto a mold surface and allowed to cure to produce the skin layer. The polyurethane reaction mixture is composed of components comprising at least an isocyanate component (either aliphatic or aromatic), isocyanate-reactive components and a catalyst component, the isocyanate component being composed of at least one isocyanate having at least two NCO— groups which are not directly attached to an aromatic group. However, polyurethanes based on aliphatic isocyanates are not light-stable polyurethanes and may require an in-mold coating and/or a post-painting step to avoid discoloration of the skin.

Instead of producing the polyurethane skins from aliphatic polyurethane formulations, it is also possible to produce them from aromatic polyurethane formulations, i.e. from polyurethane formulations the isocyanate component of which comprises an aromatic instead of an aliphatic polyisocyanate. As disclosed for example in U.S. Pat. No. 6,544,449 such aromatic polyurethane formulations have important advantages over aliphatic polyurethane formulations. Aromatic polyurethane formulations produce polyurethane elastomers having more particularly better physical properties such as higher tensile and tear strengths and better elongation and "cold flex" capability. A drawback of aromatic polyurethane elastomers is however that they become less stable after prolonged exposure to light resulting in physical property deteriation. For both aliphatic and aromatic solvent based polyurethane formulations, volatile organic compounds (VOCs) are released and scrap is not recyclable. Further, polyurethane spray process equipment requires complex mixing capabilities to mix the polyurethane reaction mixture as well as the need for solvent flushing.

There is a need for a process to make skins for automotive interior parts that offers reduced complexity while using a more environmentally friendly resin composition which is recyclable and generates minimal to no VOCs.

SUMMARY OF THE INVENTION

The present invention is a process for making a spray skin comprising the steps of: (i) spraying an aqueous polyolefin dispersion onto a heated mold, preferably equal to or greater than 50° C., forming a sprayed skin having a first surface and a second surface, and (ii) allowing the sprayed skin to dry, wherein the aqueous polyolefin dispersion is derived from the melt blending of (A) a polyolefin composition comprising an olefin block copolymer in the presence of (B) at least one dispersing agent and (C) water, wherein said aqueous dispersion preferably has a pH less than 12.

In one embodiment of the process of the present invention described herein above, the polyolefin composition comprising the olefin block copolymer further comprises one or more of a random olefin copolymer, a polyethylene, a propylene, a propylene, ethylene, α-olefin, a non-conjugated dienes based copolymers, an ethylene-vinyl acetate, an ethylene-vinyl alcohol, a chlorinated polyethylene, an alcohol functionalized polyolefin, an amine functional polyolefin, or a silane grafted polyolefin.

In one embodiment of the process of the present invention described herein above, the dispersing agent is ethylene acrylic acid (EAA), ethylene-methacrylic acid (EMA), ethylene ethyl acrylate (EEA) copolymer, ethylene methyl methacrylate (EMMA), or ethylene butyl acrylate (EBA).

In one embodiment of the process of the present invention described herein above, the polyolefin composition comprises one or more of a dye, a pigment, an organic filler, an inorganic filler, a plasticizer, a stabilizer, a surfactant, an anti-static agent, a tackifier, an oil extender, a crosslinking agent, a chemical blowing agent, an anti-microbial agent, a thickening agent, or an age resister.

In another embodiment of the process of the present invention described herein above, the process further comprises the step of (iii) providing a foam backing to the second surface of the spray skin.

In one embodiment of the process of the present invention described herein above, the process further comprises the step of (iv) applying a paint layer to the first surface of the spray skin.

In yet a further embodiment the process of the present invention described herein above, the process further comprises the step (iii) of applying a paint layer to the first surface of the spray skin and the step of (iv) providing a foam backing to the second surface of the spray skin.

In yet a further embodiment the process of the present invention described herein above the aqueous polyolefin dispersion is blended with an aqueous colorant

BRIEF DESCRIPTION OF DRAWINGS

FIG. 1 is a schematic representation of a typical melt-extrusion apparatus used to prepare the aqueous pour point depressant dispersion compositions of the present invention.

DETAILED DESCRIPTION OF THE INVENTION

The process of the present invention is a process for making a spray skin from an aqueous polyolefin dispersion, specifically an aqueous polyolefin dispersion derived from the melt blending of a polyolefin composition comprising an olefin block copolymer, a dispersing agent, and water, wherein said aqueous dispersion preferably has a pH less than 12.

The olefin block copolymers (OBC) used in the practice of this invention are well known, for example see U.S. Pat. Nos. 8,455,576; 7,579,408; 7,355,089; 7,524,911; 7,514,517; 7,582,716; and 7,504,347; all of which are incorporated in their entirety herein by reference.

"Olefin block copolymer", "olefin block interpolymer", "multi-block interpolymer", "segmented interpolymer" and like terms refer to a polymer comprising two or more chemically distinct regions or segments (referred to as "blocks") preferably joined in a linear manner, that is, a polymer comprising chemically differentiated units which are joined end-to-end with respect to polymerized olefinic, preferable ethylenic, functionality, rather than in pendent or grafted fashion. In a preferred embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the multi-block interpolymers used in the practice of this invention are characterized by unique distributions of both polymer polydispersity (PDI or Mw/Mn or MWD), block length distribution, and/or block number distribution, due, in a preferred embodiment, to the effect of the shuttling agent(s) in combination with multiple catalysts used in their preparation. More specifically, when produced in a continuous process, the polymers desirably possess PDI from 1.7 to 3.5, preferably from 1.8 to 3, more preferably from 1.8 to 2.5, and most preferably from 1.8 to 2.2. When produced in a batch or semi-batch process, the polymers desirably possess PDI from 1.0 to 3.5, preferably from 1.3 to 3, more preferably from 1.4 to 2.5, and most preferably from 1.4 to 2.

The term "ethylene multi-block interpolymer" means a multi-block interpolymer comprising ethylene and one or more interpolymerizable comonomers, in which ethylene comprises a plurality of the polymerized monomer units of at least one block or segment in the polymer, preferably at least 90, more preferably at least 95 and most preferably at least 98, mole percent of the block. Based on total polymer weight, the ethylene multi-block interpolymers used in the practice of the present invention preferably have an ethylene content from 25 to 97, more preferably from 40 to 96, even more preferably from 55 to 95 and most preferably from 65 to 85, percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In a preferred embodiment the quantity of extractable polymer using either a dialkyl ether or an alkane-solvent is less than 10, preferably less than 7, more preferably less than 5 and most preferably less than 2, percent of the total polymer weight.

In addition, the multi-block interpolymers used in the practice of the invention desirably possess a PDI fitting a Schutz-Flory distribution rather than a Poisson distribution. The use of the polymerization process described in WO 2005/090427 and U.S. Ser. No. 11/376,835 results in a product having both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phvs.* (1997) 107 (21), pp 9234-9238.

In a further embodiment, the polymers of the invention, especially those made in a continuous, solution polymerization reactor, possess a most probable distribution of block lengths. In one embodiment of this invention, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship $$Tm>-2002.9+4538.5(d)-2422.2(d)^2, \text{ or}$$

(B) Mw/Mn from about 1.7 to about 3.5, and is characterized by a heat of fusion, $\Delta H$ in J/g, and a delta quantity, $\Delta T$, in degrees Celsius defined as the temperature difference between the tallest DSC peak and the tallest CRYSTAF peak, wherein the numerical values of $\Delta T$ and $\Delta H$ have the following relationships:

$$\Delta T>-0.1299(\Delta H)+62.81 \text{ for } \Delta H \text{ greater than zero and up to 130 J/g}$$

$$\Delta T>48 \text{ C for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30 C; or (C) Elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re>1481-1629(d); \text{ or}$$

(D) Has a molecular weight fraction which elutes between 40 C and 130 C when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (E) Has a storage modulus at 25 C, G'(25 C), and a storage modulus at 100 C, G'(100 C), wherein the ratio of G'(25 C) to G'(100 C) is in the range of about 1:1 to about 9:1.

The ethylene/α-olefin interpolymer may also have:

(F) Molecular fraction which elutes between 40 C and 130 C when fractionated using TREF, characterized in that the fraction has a block index of at least 0.5 and up to about 1 and a molecular weight distribution, Mw/Mn, greater than about 1.3; or (G) Average block index greater than zero and up to about 1.0 and a molecular weight distribution, Mw/Mn greater than about 1.3.

Suitable monomers for use in preparing the ethylene multi-block interpolymers used in the practice of this present invention include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

Other ethylene multi-block interpolymers that can be used in the practice of this invention are elastomeric interpolymers of ethylene, a $C_{3-20}$ α-olefin, especially propylene, and, optionally, one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. One particularly preferred α-olefin is propylene. The propylene based polymers are generally referred to in the art as EP or EPDM polymers. Suitable dienes for use in preparing such polymers, especially multi-block EPDM type-polymers include conjugated or non-conjugated, straight or branched chain-, cyclic- or polycyclic dienes containing from 4 to 20 carbon atoms. Preferred dienes include 1,4-pentadiene, 1,4-hexadiene, 5-ethylidene-2-norbornene, dicyclopentadiene, cyclohexadiene, and 5-butylidene-2-norbornene. One particularly preferred diene is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

The ethylene multi-block interpolymers useful in the practice of this invention have a density of less than 0.90, preferably less than 0.89, more preferably less than 0.885, even more preferably less than 0.88 and even more preferably less than 0.875, g/cc. The ethylene multi-block interpolymers typically have a density greater than 0.85, and more preferably greater than 0.86, g/cc. Density is measured by the procedure of ASTM D-792. Low density ethylene multi-block interpolymers are generally characterized as amorphous, flexible and having good optical properties, e.g., high transmission of visible and UV-light and low haze.

The ethylene multi-block interpolymers useful in the practice of this invention typically have a melt flow rate (MFR) of 1-10 grams pr 10 minutes (g/10 min) as measured by ASTM D1238 (190° C./2.16 kg).

The ethylene multi-block interpolymers useful in the practice of this invention have a 2% secant modulus of less than about 150, preferably less than about 140, more preferably less than about 120 and even more preferably less than about 100, mPa as measured by the procedure of ASTM D-882-02. The ethylene multi-block interpolymers typically have a 2% secant modulus of greater than zero, but the lower the modulus, the better the interpolymer is adapted for use in this invention. The secant modulus is the slope of a line from the origin of a stress-strain diagram and intersecting the curve at a point of interest, and it is used to describe the stiffness of a material in the inelastic region of the diagram. Low modulus ethylene multi-block interpolymers are particularly well adapted for use in this invention because they provide stability under stress, e.g., less prone to crack upon stress or shrinkage. The ethylene multi-block interpolymers useful in the practice of this invention typically have a melting point of less than about 125. The melting point is measured by the differential scanning calorimetry (DSC) method described in WO 2005/090427 (US2006/0199930). Ethylene multi-block interpolymers with a low melting point often exhibit desirable flexibility and thermoplasticity properties useful in the fabrication of the wire and cable sheathings of this invention.

The polyolefin composition comprising an OBC may further comprise one or more of a random olefin copolymer, a polyethylene, a propylene, a propylene, ethylene, alpha-olefin, a non-conjugated dienes based copolymers (EPDM), an ethylene-vinyl acetate, an ethylene-vinyl alcohol, a chlorinated polyethylene, an alcohol functionalized polyolefin, an amine functional polyolefin, or a silane grafted polyolefin.

The aqueous polyolefin dispersion of the present invention uses a dispersing agent (or stabilizing agent) to promote the formation of a stable dispersion or emulsion. In selected embodiments, the stabilizing agent may be a surfactant, a polymer (different from the OBC polymer detailed above), or mixtures thereof. In certain embodiments, the polymer may be a polar polymer, having a polar group as either a comonomer or grafted monomer. Examples of suitable polar polyolefin are ethylene-vinyl acetate, ethylene-vinyl alcohol, chlorinated polyethylene, alcohol or amine functional polyolefin, silane grafted polyolefin. In preferred embodiments, the stabilizing agent comprises one or more polar polyolefins, having a polar group as either a comonomer or grafted monomer. For example, the dispersing agent may include an ethylene/alpha-beta unsaturated carboxylic acid copolymer. In some embodiments, the ethylene/alpha-beta unsaturated carboxylic acid copolymer may include an ethylene-acid copolymer, such as an ethylene-acrylic acid copolymer or an ethylene methacrylic acid copolymer.

Typical polymers include ethylene-acrylic acid (EAA) and ethylene-methacrylic acid copolymers, such as those available under the trademarks PRIMACOR™ (trademark of The Dow Chemical Company), NUCREL™ (trademark of E.I. DuPont de Nemours), and ESCOR™ (trademark of ExxonMobil) and described in U.S. Pat. Nos. 4,599,392; 4,988,781; and 5,938,437, each of which is incorporated herein by reference in its entirety. Other polymers include ethylene-methacrylic acid (EMA), ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other surfactants that may be used include long chain fatty acids or fatty acid salts having from 12 to 60 carbon atoms. In other embodiments, the long chain fatty acid or fatty acid salt may have from 12 to 40 carbon atoms.

If the polar group of the polymer is acidic or basic in nature, the stabilizing polymer may be partially or fully neutralized with a neutralizing agent to form the corresponding salt. In certain embodiments, neutralization of the stabilizing agent, such as a long chain fatty acid or EAA, may be from 25% to 200% on a molar basis; from 50% to 110% on a molar basis in other embodiments. For example, for EAA, the neutralizing agent is a base, such as ammonium hydroxide or potassium hydroxide, for example. Other neutralizing agents may include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

Additional surfactants that may be useful in the practice of the present invention include cationic surfactants, anionic surfactants, zwitterionic, or non-ionic surfactants. Examples of anionic surfactants include sulfonates, carboxylates, and phosphates. Examples of cationic surfactants include quaternary amines Examples of non-ionic surfactants include block copolymers containing ethylene oxide and silicone surfactants. Surfactants useful in the practice of the present invention may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid salt. Internal surfactants are surfactants that do become chemically reacted into the polymer during dispersion preparation. An example of an internal surfactant useful herein includes 2,2-dimethylol propionic acid and its salts.

In particular embodiments, the dispersing agent or stabilizing agent may be used in an amount ranging from greater than zero to about 60% by weight based on the amount of base polymer (or base polymer mixture) used. For example, long chain fatty acids or salts thereof may be used in an amount ranging from 0.5% to 10% by weight based on the amount of base polymer. In other embodiments, ethylene-acrylic acid or ethylene-methacrylic acid copolymers may be used in an amount from 0.5% to 60% by weight based on polymer. In yet other embodiments, sulfonic acid salts may be used in an amount from 0.5% to 10% by weight based on the amount of base polymer.

While any method may be used, one convenient way to prepare the aqueous pour point dispersion compositions described herein is by melt-kneading. Any melt-kneading means known in the art may be used. In some embodiments a kneader, a Banbury mixer, single-screw extruder, or a multi-screw extruder is used. The melt-kneading may be conducted under the conditions which are typically used for melt-kneading the OBC resin. A process for producing the dispersions in accordance with the present invention is not particularly limited. One preferred process, for example, is a process comprising melt-kneading the OBC and EAA, and any other additives according to U.S. Pat. Nos. 5,756,659; 7,763,676; and 7,935,755, all of which are incorporated herein by reference in their entirety. A preferred melt-kneading machine is, for example, a multi screw extruder having two or more screws, to which a kneading block can be added at any position of the screws. If desired, it is allowable that the extruder is provided with a first material-supplying inlet and a second material-supplying inlet, and further third and forth material-supplying inlets in this order from the upper stream to the downstream along the flow direction of a material to be kneaded. Further, if desired, a vacuum vent may be added at an optional position of the extruder. In some embodiments, the pour point dispersion comprising the thermoplastic polymer, dispersing agent, and any other additives is first diluted to contain about 1 to about 3 percent by weight of water and then subsequently further diluted to comprise greater than 25 percent by weight of water. In some embodiments, the further dilution provides a dispersion with at least about 30 percent by weight of water. The aqueous dispersion obtained by the melt kneading may be further supplemented with a glycol, preferably ethylene glycol. The aqueous pour point depressant dispersions described hereinabove may be used as prepared or diluted further with additional water and/or glycol.

FIG. 1 schematically illustrates an extrusion apparatus which can be used in the process of the present invention. An extruder 20, preferably a twin screw extruder, is coupled to a back pressure regulator, melt pump, or gear pump, 30. Preferably, the apparatus further comprises a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar may be used to provide the base and the initial water to the extruder 20. In other embodiments, a liquid injection pump provides a flow of 300 cc/min at 200 bar or 600 cc/min at 133 bar. In some embodiments the base and initial water are preheated in a preheater.

The OBC, in the form of pellets, powder, or flakes, is fed from the feeder 80 to an inlet 90 of the extruder 20 where the resin is melted or compounded. In some embodiments, the EAA dispersing agent and/or stabilizing agent is added to the resin through an opening along with the resin and in other embodiments, the dispersing agent and/or stabilizing agent is provided separately to the twin screw extruder 20. The resin melt is then delivered from the mix and convey zone to an emulsification zone of the extruder where the initial amount of water and base from the reservoirs 40 and 50 is added through inlet 55. In some embodiments, dispersing agent may be added additionally or exclusively to the water stream. In some embodiments, the emulsified mixture is further diluted with additional water and/or glycol and/or stabilizing agent via inlet 95 from reservoir 60 in a dilution and cooling zone of the extruder 20. Typically, the dispersion is diluted to at least 30 weight percent water in the cooling zone. In addition, the diluted mixture may be diluted any number of times until the desired dilution level is achieved.

In one embodiment of the method to make the aqueous polyolefin dispersions of the present invention, step a, all of the OBC, the dispersing agent EAA; and water are combined to form an aqueous dispersion of OBC in one step.

In a another embodiment of the method to make the aqueous polyolefin dispersions of the present invention, some or all of the water and/or stabilizing agent is not added into the twin screw extruder 20 but rather, step b, to a stream containing the dispersed polymer after it has exited from the extruder. In other words, step b does not occur in the extruder in which the aqueous dispersion of OBC is produced. In this manner, steam pressure build-up in the extruder 20 is minimized.

In a preferred embodiment, a basic substance or aqueous solution, dispersion or slurry thereof is added to the dispersion at any point of the process, preferably to the extruder. Typically the basic substance is added as an aqueous solution. But in some embodiments, it is added in other convenient forms, such as pellets or granules. In some embodiments, the basic substance and water are added through separate inlets of the extruder. Examples of the basic substance which may be used for the neutralization or the saponification in the melt kneading process include alkaline metals and alkaline earth metals such as sodium, potassium, calcium, strontium, barium; inorganic amines such as hydroxylamine or hydrazine; organic amines such as methylamine, ethylamine, ethanolamine, cyclohexylamine, tetramethylammonium hydroxide; oxide, hydroxide, and hydride of alkaline metals and alkaline earth metals such as sodium oxide, sodium peroxide, potassium oxide, potassium peroxide, calcium oxide, strontium oxide, barium oxide, sodium hydroxide, potassium hydroxide, calcium hydroxide, strontium hydroxide, barium hydroxide, sodium hydride, potassium hydride, calcium hydride; and weak acid salts of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate; or ammonium hydroxide. In particular embodiments, the basic substance is a hydroxide of an alkaline metal or a hydroxide of an alkali metal. In some embodiments, the basic substance is selected from potassium hydroxide, sodium hydroxide and combinations thereof.

The OBC polymer of the aqueous polyolefin dispersion of the present invention has an advantageous particle size distribution. In particular embodiments, the dispersed OBC polymer has a particle size distribution defined as volume average particle diameter (Dv) divided by number average particle diameter (Dn) of equal to or less than 2.5, preferably equal to or less than 2.0. In other embodiments, the dispersions have a particle size distribution of less than or equal to 1.9, 1.7, or 1.5.

A preferred volume average particle size is equal to or less than 2 micron (μm), preferably equal to or less than 1.5 μm, preferably equal to or less than 1.2 μm, and more preferably equal to or less than 1 μm. In other embodiments, the average particle size ranges from 0.05 μm to 1 μm. In still other embodiments, the average particle size of the dispersion ranges from 0.5 μm to 1.2 μm, preferably 0.5 μm to 1 μm. For particles that are not spherical the diameter of the particle is the average of the long and short axes of the particle. Particle sizes can be measured on a Coulter LS230 light-scattering particle size analyzer or other suitable device.

The dispersions of the present invention have a pH equal to or greater than 5, preferably equal to or greater than 8, and more preferably equal to or greater than 10. The dispersions of the present invention have a pH equal to or less than 13.5, preferably equal to or less than 13, and more preferably equal to or less than 12.

The aqueous polyolefin dispersion of the present invention maybe applied through a nozzle of any suitable spray equipment, for example a spray gun. The dispersion is sprayed onto the surface of a mold. The surface of the mold may be smooth, i.e., no texture, or preferably the surface of the mold may be textured with any desirable texture. The spray skin preferably has an average thickness of at least 0.5 mm, preferably of at least 0.75 mm and more preferably of at least 1 mm After the aqueous polyolefin dispersion of the present invention has been sprayed onto the mold surface it is allowed to dry. Depending on the desired thickness of the final skin, more than one spray application may be performed, in such an embodiment, a first layer is sprayed and allowed to dry, a second layer is sprayed and allowed to dray, and a third layer is sprayed and allowed to dry. etc. until the desired number of layers/skin thickness is achieved. The thickness and texture is selected to provide a unique skin touch and high quality feeling. The spray skin of the present invention has a first surface and a second surface.

In one embodiment, the mold is heated, preferably to temperature equal to or greater than 50° C., more preferably equal to or greater than 65° C., and more preferably equal to or greater than 80° C. Preferably, the mold is heated, to temperature equal to or less than 110 C, more preferably equal to or less than 100° C., and more preferably equal to or less than 90° C. The aqueous polyolefin dispersion of the present invention may comprise one or more of a dye, a pigment, an organic filler, an inorganic filler (including clay, talc, calcium carbonate, titanium dioxide, glass fiber, carbon fibers, nano-sized particles), a plasticizer, a stabilizer (such as, but not limited to antioxidants, UV stabilizers, fire retardants, and the like), a surfactant, an anti-static agent, a tackifier, an oil extender (including paraffinic or napthelenic oils), a crosslinking agent (such as sulfur, peroxide, phenolic, silane or azide based compounds), a chemical blowing agent, an anti-microbial agent, a thickening agent, or an age resister.

In one embodiment of the process of the present invention the aqueous polyolefin dispersion is blended with an aqueous colorant. Preferably, the aqueous colorant comprises one or more of a dye, a pigment, an organic filler, an inorganic filler (including clay, talc, calcium carbonate, titanium dioxide, glass fiber, carbon fibers, nano-sized particles), a plasticizer, a stabilizer (such as, but not liited to antioxidants, UV stabilizers, fire retardants, and the like), a surfactant, an anti-static agent, a tackifier, an oil extender (including paraffinic or napthelenic oils), a crosslinking agent (such as sulfur, peroxide, phenolic, silane or azide based compounds), a chemical blowing agent, an anti-microbial agent, a thickening agent, or an age resister.

In one embodiment of the process of the present invention the aqueous polyolefin dispersion is blended with other aqueous of dispersions (for example an aqueous acrylic dispersion or an aqueous polyurethane dispersion) to create a hybrid dispersion that may improve haptics, gloss, and abrasion performance In one embodiment of the process of the present invention the aqueous polyolefin dispersion is charged. This may enable greater transfer efficiency to a grounded mold and/or improved skin quality.

In one embodiment of the process of the present invention one or both surfaces of the skin of the present invention may further be laminated or bonded to another structure such as a molded plastic article by any suitable means, such as back injection molding, with adhesives, or as upholstery replacing leather or PVC leather-look. In this embodiment, the process of the present invention comprises the step of laminating the skin to another structure.

In one embodiment of the process of the present invention one or both surface of the spray skin may be painted providing a layer of paint on one or both surface of the spray skin. The paint may be applied in mold prior to forming the spray skin or out of the mold after the spray skin is formed. In this embodiment, the process of the present invention comprises the step of applying a layer of paint to the spray skin, either in-mold or after the skin is formed. The paint layer may be adhered directly to the spray skin or may have an adhesive layer in between.

In one embodiment of the process of the present invention one or both surface of the spray skin may comprise a foam backing, preferably a polyurethane foam backing. In this embodiment, the process of the present invention comprises the step of applying a foam backing to one or both surface of the spray skin, preferably by foaming the backing onto the spray skin in a mold. The foam backing may be adhered directly to the spray skin or may have an adhesive layer in between.

In one embodiment of the process of the present invention a paint layer is applied to the first surface of the spray skin and a foam backing, preferably a polyurethane foam backing is applied to the second surface of the spray skin.

The foregoing may be better understood by the following Examples, which are presented for purposes of illustration and are not intended to limit the scope of this invention.

EXAMPLES

The following aqueous polyolefin dispersions comprise a polyolefin polymer, a dispersing agent, water, and are neutralized with KOH. The compositions of the Examples 1 to 5 are given in Table 1. In Table 1:

"OBC-1" is an ethylene octene block copolymer having 10.4% octene, having a density of 0.887 g/cm$^3$, a 5 g/10 min melt flow rate (MFR) determined at 190° C. under a load of 2.16 Kg, a melting temperature of 123° C., a heat of fusion of 70 J/g and a Shore A hardness of 83 available as INFUSE™ D9530 from The Dow Chemical Company;

"OBC-2" is an ethylene octene block copolymer having 15.3% octene, having a density of 0.866 g/cm$^3$, a 5 g/10 min MFR (190° C./2.16 Kg), a melting temperature of 123° C., a heat of fusion of 31 J/g and a Shore A hardness of 60 available as INFUSE 9507 from The Dow Chemical Company;

"SLEP" is a substantially linear ethylene-octene copolymer elastomer with a 5 g/10 min MFR (190° C./2.16 Kg) and a density of 0.868 g/cm$^3$ available as ENGAGE™ 8200 from The Dow Chemical Company;

"EAA" is an ethylene acrylic acid copolymer having 20% acrylic acid with a density of 0.958 g/cm$^3$, a 300 g/10 min MFR (190° C./2.16 Kg), and a melting temperature of 78° C. available as PRIMACOR™ 5980i from The Dow Chemical Company; and "UNICID™ 350" is a $C_{26}$ carboxylic acid having an acid value of 115 KOH/g available from Baker Petrolite.

In the following Examples a polyolefin resin is dispersed using the method described in U.S. Pat. No. 7,763,676, which is hereby incorporated by reference in its entirety, using a dispersing agent and water as the solvent. The extruder based mechanical dispersion process imparts high shear on a polymer melt/water mixture to facilitate a water continuous system with small polymer particles in the presence of surface active agents that reduce the surface tension between the polymer melt and water. A high solids content water continuous dispersion is formed in the emulsification zone of the extruder also known as high internal phase emulsion (HIPE) zone, which is then gradually diluted to the desired solids concentration, as the HIPE progresses from the emulsification zone to the first and second dilution zones.

The polyolefin polymer is fed into the feed throat of the extruder by means of a loss-in weight feeder. The dispersion agent is added with the polyolefin polymer. The extruder and its elements are made of Nitrided Carbon Steel. The extruder screw elements are chosen to perform different unit operations as the ingredients pass down the length of the screw. There is first a mixing and conveying zone, next an emulsification zone, and finally a dilution and cooling zone. Steam pressure at the feed end is contained by placing kneading blocks and blister elements between the melt mixing zone and was contained and controlled by using a Back-Pressure Regulator. ISCO dual-syringe pumps metered the Initial Water, Base, and Dilution flows to their respective injection ports. The polyolefin, dispersing agent, and water are melt kneaded in the twin screw extruder at a screw RPM of 1150 and neutralized with KOH. Process parameters and product characteristics are summarized in Table 1. In Table 1, the mean particle size of the dispersed polymer phase is measured by a Coulter LS230 particle analyzer consisted of an average volume diameter in microns. Viscosity is determined according to Brookfield Viscometer. Solids are determined by moisture analyzer. Filterable residue is determined by filtration through a 70 mesh (200 um) Too much residue can have a negative impact on the ability to spray via a nozzle gun Spray skins are made for each of Example 1 to 5 by spraying the dispersion with a hand held pneumatic spray gun on 5 inch by 5 inch grained tool that is pre-heated to 80° C. in a convection oven. After a couple of layers of applied skin, the tool is placed back in the oven to remove the moisture. The process is repeated till a 1 mm skin is produced. This is achieved by weighing the tool and spraying the tool till ~10 g of skin is deposited.

The skins made with Example 5 (using a non-EAA dispersing agent) did not make good skin. The skin cracked on drying, is brittle, and the film forming process is not effective.

B-side is detailed in Table 2. The index of the foam is 100 and resulting density is 9 pounds per cubic foot.

The foaming is carried out using a Graco machine using a 20 inch by 20 inch by 0.5 inch mold. The skin is placed in the mold, the mold is closed, and the polyurethane is foamed onto it. The samples are peeled manually and examined for the amount of cohesive failure. Example 2 showed 50% cohesion, Example 3 to 5 showed 100% cohesion.

Polyurethane Paint Adhesion.

The same mold and molding machine used herein above are used to determine paint adhesion to a foam-backed skin. The mold temperature is set at 75° C. The sequence of molding is: (1) Apply the paint to the mold surface, the paint is Red Spot 558W, a 1 component PU waterborne flexible paint used in applications requiring flexible usage like seats and arm rests. (2) Cure the paint layer (~250 um thick). This was followed by (3) manual spraying of Example 3 to make a skin approximately 0.5 mm in thickness. The dispersion is applied slowly in layers allowing for sufficient drying time. A hand-held paint is used to spray the dispersion. The spray dried dispersion made a good quality skin that stuck well to the PU paint. (4) the polyurethane foam to a thickness of about 12.5 mm. The mold insert is removed to allow better heat transfer; enabling improved drying of the dispersions. The demold time is 4 minutes. Paint and foam adhesion to the skin is excellent.

The A-side is SPECFLEX NE344 isocyanate and the B-side is detailed in Table 3.

TABLE 1

|  | Example 1* | Example 2 | Example 3 | Example 4 | Example 5* |
|---|---|---|---|---|---|
| COMPOSITION |  |  |  |  |  |
| Polyolefin, % | SELP, 60 | OBC-1, 77.5 | OBC-1, 60 | OBC-1, 30 and OBC-2, 40 | OBC-2, 93 |
| Dispersing agent, % | EAA, 40 | EAA, 22.5 | EAA, 40 | EAA, 40 | UNICID, 7 |
| Base | KOH | KOH | KOH | KOH | KOH |
| Degree of Neutralization, % | 84.9 | 85.1 | 84.9 | 84.9 | 84.9 |
| Target solids, wt % | 42 | 41 | 42 | 42 | 42 |
| PROCESS PARAMETER |  |  |  |  |  |
| Extruder pressure, psi | 325 | 520 | 428 | 442 | 390 |
| Extruder outlet temperature, ° C. | 99 | 98 | 98 | 98 | 97 |
| Dispersion temperature, ° C. | 26 | 35 | 35 | 34 | 33 |
| Extruder amps | 79 | 83 | 84 | 76 | 74 |
| PRODUCT CHARACTERISTICS |  |  |  |  |  |
| Mean particle size, micron | 1.34 | 1.45 | 1.37 | 1.25 | 0.97 |
| pH | 10.07 | 10.38 | 10.09 | 10.11 | 10.24 |
| Viscosity @ 20 RPM, cP | 288 | 116 | 314 | 26 | 290 |
| Actual solids, wt % | 40.57 | 39.03 | 40.24 | 40.33 | 38.87 |
| Filterable residue, ppm | 26 | 42 | 19 | 67 | 23 |

*not an example of the present invention

The haptics of the skins produced with EAA (Examples 1 to 4) are very good and is improved with the amount of EAA. The skins feel soft and pliable and the grain replication is good.

Heat Resistance.

Small sections are cut from the skins for Examples 1 to 4 and are aged in an oven at 100° C. for 4 hrs. The skins for Examples 2 to 4 maintained their integrity and demonstrated good retention of the texture. Example 1 melted (the base elastomer has a melting point of 65° C.).

Scratch and Abrasion Resistance.

Examples 2 and 3 are scratched using a GM scratch device set at 15N. No visible scratch results.

Adhesion to Polyurethane Foam Backing.

Examples 2 and 3 are backed with a typical polyurethane foam system. The A-side is PAPI 94 isocyanate and the

TABLE 2

| B-Side | Components | Parts |
|---|---|---|
| Polyols | VORANOL ™ CP 6001 | 70.50 |
|  | SPECFLEX ™ NC 630 | 10.00 |
| Copolymer Polyol | SPECFLEX NC 701 | 10.00 |
| Crosslinkers | TEOA-99 | 0.85 |
|  | DEOA Pure | 0.15 |
| Chain Extender | 1,4 BDO | 0.50 |
| Catalysts | DABCO ™ BL-19/A-99 |  |
|  | JEFFCAT ™ ZF-10 | 0.30 |
|  | TOYOCAT ™ RX-20 | 0.90 |
|  | POLYCAT ™ 15 | 0.20 |

TABLE 2-continued

| B-Side | Components | Parts |
|---|---|---|
| Cell Opener | VORANOL 4053 | 1.00 |
| Adhesion Promoter | DIEXTER ™ G 156T-63 | 2.50 |
| Colorant | REACTINT ™ Black 2151 | 0.40 |
| Blowing Agent | Water | 2.70 |
| | Total | 100.00 |

VORANOL CP 6001 is a polyol available from The Dow Chemical Company.
SPECFLEX NC 630 is a polyol available from The Dow Chemical Company.
SPECFLEX NC 701 is a cpp polyol available from The Dow Chemical Company.
TEOA-99 is triethanolamine catalyst available from Sierra Chemical Company.
DEOA Pure is Diethanolamine available from Air Products.
1,4 BDO is butanediol available from Evonik.
Dabco BL-19 is blowing catalyst available from Air Products.
JEFFCAT ZF-10 is blowing catalyst available from Huntsman Corporation (N,N,N'-trimethyl-N'-hydroxyethyl bisaminoethylether).
TOYOCAT RX-20 is an amine catalyst available from Tosoh.
POLYCAT 15 is a low emission reactive amine catalyst available from Air Products.
VORNAL 4053 is a high functionality EO-rich cell opener available from The Dow Chemical Company.
DIEXTER G 156T-63 is saturated polyester available from Coim.
REACTINT Black 2151 is a black concentrate available from Milliken Chemical.

TABLE 3

| B-Side | Component | Parts |
|---|---|---|
| polyols | VORANOL 4701 | 33.91 |
| | SPECFLEX NC 630 | 25.67 |
| Copolymer Polyol | SPECFLEX NC 701 | 35.51 |
| Cell Opener | VORANOL CP 1421 | 1.52 |
| Crosslinker | DEOA LF | 0.96 |
| Surfactant | TEGOSTAB B 8729 LF2 | 0.30 |
| Catalysts | DABCO NE210 | 0.30 |
| | POLYCAT 15 | 0.71 |
| | JEFFCAT DPA | 0.61 |
| | Water | 0.51 |
| | Total | 100 |

VORNAL 4701 is a polyol available from The Dow Chemical Company.
SPECFLEX NE 344 an isocyanate available from The Dow Chemical Company.
VORANOL CP 1421 is a polyol, used as a cell opener available from The Dow Chemical Company.
DEOA LF is diethanolamine available from Air Products.
TEGOSTAB B 8729 LF2 is silicone surfactant available from Evonik.
DABCO NE210 is low emission amine catalyst available from Air Products.
JEFFCAT DPA is low emission amine catalyst available from Huntsman.

What is claimed is:

1. A process for making a spray skin comprising the steps of:
   (i) spraying an aqueous polyolefin dispersion onto a heated mold forming a sprayed skin having a first surface and a second surface, and
   (ii) allowing the sprayed skin to dry,
   wherein the aqueous polyolefin dispersion is derived from the melt blending of (A) a polyolefin composition comprising an olefin block copolymer in the presence of (B) at least one dispersing agent which is a polar polymer and (C) water and wherein the aqueous polyolefin dispersion consists essentially of the olefin block copolymer, the dispersing agent, water, and optionally one or more of dye, a pigment, an organic filler, an inorganic filler, a plasticizer, a stabilizer, a surfactant, an anti-static agent, a tackifier, an oil extender, a chemical blowing agent, an anti-microbial agent, a thickening agent, an age resister, an aqueous acrylic dispersion, or an aqueous polyurethane dispersion.

2. The process of claim 1 wherein (A) the polyolefin composition comprising the olefin block copolymer further comprises one or more of a random olefin copolymer, a polyethylene, a propylene, a propylene, ethylene, α-olefin, a non-conjugated dienes based copolymers, an ethylene-vinyl acetate, an ethylene-vinyl alcohol, a chlorinated polyethylene, an alcohol functionalized polyolefin, an amine functional polyolefin, or a silane grafted polyolefin.

3. The process of claim 1 wherein (B) the dispersing agent comprises a polymer selected from the group consisting of ethylene acrylic acid (EAA), ethylene-methacrylic acid (EMA), ethylene ethyl acrylate (EEA), ethylene methyl methacrylate (EMMA), or ethylene butyl acrylate (EBA).

4. The process of claim 1 wherein the aqueous polyolefin dispersion is derived from the melt blending of (A) an olefin block copolymer in the presence of (b) an ethylene acrylic acid as a dispersing agent and (C) water.

5. The process of claim 1 wherein the polyolefin composition comprises one or more of a dye, a pigment, an organic filler, an inorganic filler, a plasticizer, a stabilizer, a surfactant, an anti-static agent, a tackifier, an oil extender, a crosslinking agent, a chemical blowing agent, an anti-microbial agent, a thickening agent, or an age resister.

6. The process of claim 1 wherein the mold is heated to equal to or greater than 50° C.

7. The process of claim 1 further comprising the step of (iii) applying a paint layer to the first surface of the spray skin.

8. The process of claim 1 further comprising the step of (iv) providing a foam backing to the second surface of the spray skin.

9. The process of claim 1 further comprising the step of (iii) applying a paint layer to the first surface of the spray skin and the step of (iv) providing a foam backing to the second surface of the spray skin.

10. The process of claim 1 wherein the aqueous polyolefin dispersion is blended with an aqueous colorant.

11. The process of claim 1 further comprising bonding the skin to another structure.

12. The process of claim 11 wherein the bonding comprises laminating.

13. The process of claim 7 which forms an automotive interior article.

14. The process of claim 8 which forms an automotive interior article.

15. The process of claim 11 which forms an automotive interior article.

16. The process of claim 1 wherein the aqueous polyolefin dispersion consists of the olefin block copolymer, the dispersing agent, water, and optionally one or more of dye, a pigment, an organic filler, an inorganic filler, a plasticizer, a stabilizer, a surfactant, an anti-static agent, a tackifier, an oil extender, a chemical blowing agent, an anti-microbial agent, a thickening agent, an age resister, an aqueous acrylic dispersion, or an aqueous polyurethane dispersion.

* * * * *